(12) United States Patent
Jin et al.

(10) Patent No.: US 7,733,949 B2
(45) Date of Patent: Jun. 8, 2010

(54) WIRELESS COMMUNICATIONS SYSTEM WITH REDUCED SIDEBAND NOISE AND CARRIER LEAKAGE

(75) Inventors: Hang Jin, Plano, TX (US); Ahmadreza Hedayat, Allen, TX (US); George Bednekoff, Plano, TX (US); Mitch Johnson, McKinney, TX (US); Wenhua Zhou, Plano, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 791 days.

(21) Appl. No.: 11/592,823

(22) Filed: Nov. 4, 2006

(65) Prior Publication Data

US 2007/0127561 A1 Jun. 7, 2007

Related U.S. Application Data

(60) Provisional application No. 60/748,456, filed on Dec. 7, 2005.

(51) Int. Cl.
*H04B 1/38* (2006.01)
*H04L 5/16* (2006.01)

(52) U.S. Cl. .............. 375/221; 375/224; 375/226; 455/73; 379/3

(58) Field of Classification Search .............. 455/67.11, 455/73, 75–78, 130, 269, 280, 283–285, 455/295–296, 302; 379/1.01, 3, 406.01, 379/406.05; 375/219, 221, 226–228, 224
See application file for complete search history.

(56) References Cited

U.S. PATENT DOCUMENTS

| 2003/0171110 A1 | 9/2003 | Shi et al. | |
| 2003/0206603 A1* | 11/2003 | Husted | 375/324 |
| 2006/0034356 A1* | 2/2006 | Fechtel | 375/219 |

OTHER PUBLICATIONS

International Preliminary Report on Patentability dated Jun. 11, 2008 cited in PCT/US2006/044728.

* cited by examiner

*Primary Examiner*—Shuwang Liu
*Assistant Examiner*—James M Perez

(57) ABSTRACT

A wireless communications system is provided with reduced sideband noise and carrier leakage. In the system, at least one transmitter modulates at least one input signal with a first carrier to generate a modulated output signal, and at least one receiver receives the modulated output signal and demodulates the same with a second carrier to generate at least one demodulated output signal. The first and second carriers are at different frequencies, such that the sideband noise and carrier leakage generated by different sources can be distinguished.

11 Claims, 2 Drawing Sheets

US 7,733,949 B2

WIRELESS COMMUNICATIONS SYSTEM WITH REDUCED SIDEBAND NOISE AND CARRIER LEAKAGE

CROSS REFERENCE

The present application claims the benefits of U.S. Patent Provisional Application No. 60/748,456, which was filed on Dec. 7, 2005.

FIELD OF THE INVENTION

This disclosure relates generally to wireless communications, and more particularly to a system and method for detecting and reducing sideband noise and carrier leakage.

BACKGROUND

A wireless communications system typically includes a transmitter and a receiver for sending signals over carrier waves. The transmitter modulates information, such as voice, text, image, audio, and video data, onto a carrier before sending it to the receiver. The receiver demodulates the received signals to recover the original information. One of the typically used modulation schemes is IQ modulation, where I and Q represent in-phase and quadrature parts of a modulated signal. The IQ modulation is an efficient way of sending information, particularly in digital formats.

There are various factors that can cause the transmitter to generate imperfect modulated output signals. For example, in a quadrature modulation scheme, IQ imbalance, which occurs when there are different amplitude and phase distortions in I and Q channels, is one of the widely-recognized factors causing imperfect signals. The IQ imbalance induces sideband noise, which is essentially an image frequency interference "aliasing" into a desired signal band. The sideband noise degrades signal reception in a wireless communications system. The IQ imbalance has become a crucial issue as higher-level modulations appear in communications standards and low-cost, direct-conversion transmitters and receivers are increasingly employed in wireless communications systems.

Another typical factor causing imperfect signals is the hardware-induced carrier leakage. The carrier leakage, which is at the same frequency as the carrier, is often induced by the limited isolation between the carrier and output ports of the transmitter. On an IQ plane, a modulated signal with carrier leakage appears with a fixed offset vector.

Conventional solutions to combat carrier leakage rely on implementation of additional circuitry. The solutions for IQ imbalance are usually based on cancellation of the sideband noise in the transmitter, which also require additional circuitry or manufacturing calibration. For example, one can detect the sideband noise and carrier leakage by sampling an output signal, and minimize the same through hardware calibration. The signal sampling can be performed by using a testing receiver to detect output signals from a device under a test (DUT) transmitter.

One drawback of the conventional solutions is that the carrier leakage and sideband noise generated by the DUT transmitter cannot be distinguished from those generated by the testing receiver. This prevents an accurate calibration of the sideband noise and carrier leakage for the DUT transmitter.

As such, what is needed is a detection scheme to identify the sideband noise and carrier leakage of the DUT transmitter apart from those of the testing receiver.

SUMMARY

Disclosed herein is a wireless communications system with reduced sideband noise and carrier leakage. In the system, at least one transmitter modulates at least one input signal with a first carrier to generate a modulated output signal, and at least one receiver receives the modulated output signal and demodulates the same with a second carrier to generate at least one demodulated output signal. The first and second carriers are at difference frequencies, such that the sideband noise and carrier leakage generated by different sources can be distinguished.

The construction and method of operation of the invention, however, together with additional objectives and advantages thereof will be best understood from the following description of specific embodiments when read in connection with the accompanying drawings.

DESCRIPTION

Figure 1:
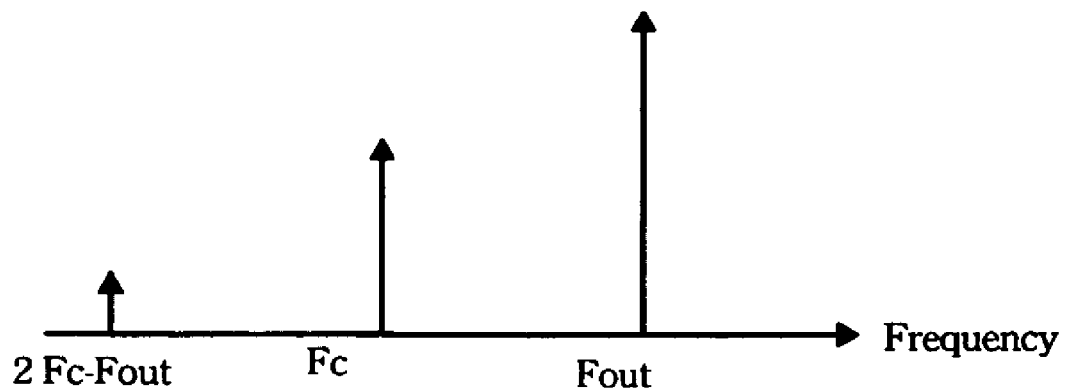
FIG. 1 illustrates a frequency spectrum of an output signal from a conventional transmitter.

FIG. 1 illustrates a frequency spectrum of an output signal from a conventional transmitter (not shown in the figure). Frequency is plotted on the X-axis and amplitude on the Y-axis. Fc denotes the frequency of a carrier that modulates an input signal, Fout denotes the center frequency of a modulated signal output from the transmitter, and Fc−2*Fout denotes the center frequency of side band noise associated with the modulated signal located at frequency Fout. Here the output signals are represented by their center frequencies for simplicity. The output frequency Fout is offset from the carrier frequency Fc because of certain unwanted frequency components generated as a result of the IQ imbalance and carrier leakage of the transmitter. The IQ imbalance induces sideband noise, which is essentially an image frequency interference "aliasing" into the desired signal band. Due to limited isolation between the carrier and the output ports of the transmitter, there is always carrier leakage appearing as a signal at the same frequency of the carrier. The relation between the center frequency Fout of the output signal and the carrier frequency Fc is expressed by the following equation.

$$Fout = Fc + If$$

where If is the frequency of intermediate carrier. In the case where the direct conversion architecture is used (base band I and Q signals are directly converted to RF carrier), If is zero.

Figure 2:
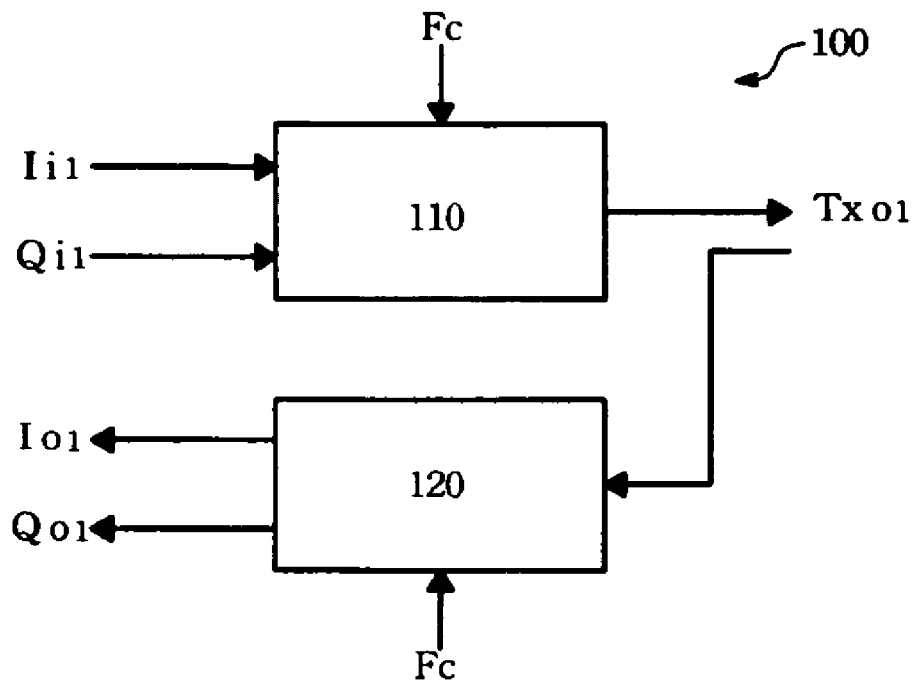
FIG. 2 illustrates a conventional wireless communications system for detecting sideband noise and carrier leakage.

FIG. 2 illustrates a conventional wireless communications system 100 for detecting the sideband noise. The system 100 includes a DUT transmitter 110 and a testing receiver 120. The DUT transmitter 110 receives an input signal having an in-phase part $I_{t1}$ and a quadrature phase part $Q_{t1}$. The DUT transmitter 110 receives a carrier of frequency Fc, and converts the input signal to a modulated output signal $TXo_1$. A sample of the modulated output signal $TXo_1$ is coupled into the testing receiver 120. The testing receiver 120 receives a carrier of frequency Fc, and converts the modulated signal $TX_{o1}$ back to a demodulated output signal that has an in-phase part $Io_1$ and a quadrature phase part $Qo_1$.

The conventional system 100 can detect the sideband noise and carrier leakage by sampling the output signal, and then minimizes their magnitudes using hardware calibration. The frequency of the output signals from the testing receiver 120 should be the same as that of the output signal from the DUT transmitter 110. The frequency spectrum of the output signals from the testing receiver 120 usually contains various unwanted frequency components, such as the carrier leakage of the transmitter 110, carrier leakage of the receiver 120, sideband noise of the transmitter 110 corresponding to its input signal, sideband noise of the receiver 120 corresponding to its input signal, sideband noise of the receiver 120 corresponding to the carrier leakage of the transmitter 110, sideband noise of the receiver 120 corresponding to the sideband noise of the transmitter 110 that is corresponding to its input signal.

One drawback of the conventional system is its inability to distinguish the sideband noise and carrier leakage induced by the DUT transmitter from those induced by the testing receiver, because the carriers of the transmitter and receiver have the same frequency.

Figure 3:
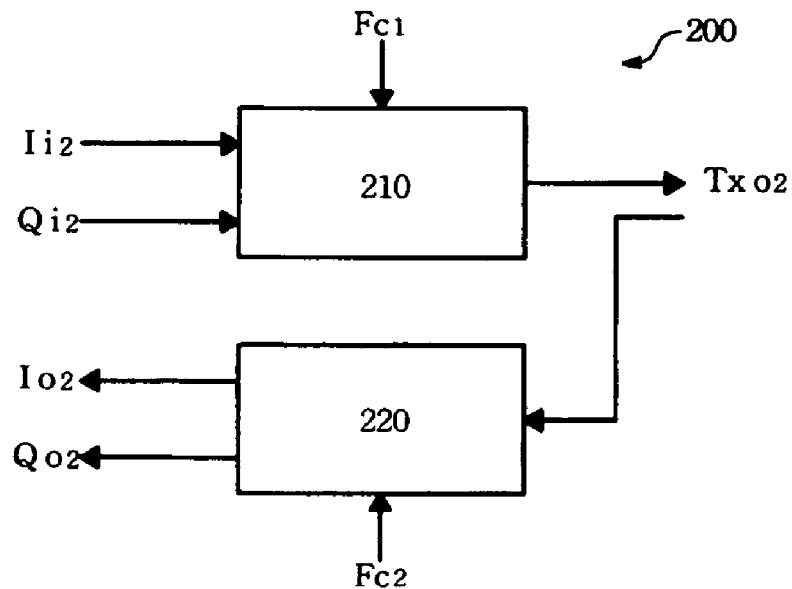
FIG. 3 illustrates a proposed wireless communications system for detecting sideband noise and carrier leakage in accordance with one embodiment.

FIG. 3 illustrates a proposed wireless communications system 200 for detecting the sideband noise and carrier leakage in accordance with one embodiment. The system 200 includes a DUT transmitter 210 and a testing receiver 220. The DUT transmitter 210 receives an input signal having an in-phase part $I_{i2}$ and quadrature phase part $Q_{i2}$. The DUT transmitter 210 receives a carrier of frequency Fc.sub.1, and converts the input signal to a modulated output signal $TX_{o2}$. A sample of the modulated output signal $TX_{o2}$ is input into the testing receiver 220. The testing receiver 220 receives a carrier of frequency $Fc_2$, and converts the modulated signal $TX_{o2}$ back to a demodulated output signal that has an in-phase part $I_{o2}$ and a quadrature phase part $Q_{o2}$.

In this embodiment, the carrier frequency $Fc_2$ used by the testing receiver 220 is different from the carrier frequency $Fc_1$ used by the DUT transmitter 210. In the system 200, the frequency spectrum of the output signal from the testing receiver 220 contains the input signal and carrier leakage of the transmitter 210, and the sideband noise of the transmitter 210 corresponding to its input signal, the carrier leakage of the receiver 220, the sideband noise of the receiver 220 corresponding to its input signal, the sideband noise of the receiver 220 corresponding to the carrier leakage of the transmitter 210, the sideband noise of the receiver 220 corresponding to the sideband noise of the transmitter 210 that is corresponding to its input signal. Due to the difference between the carrier frequencies $Fc_1$ and $Fc_2$, the sideband noise and carrier leakage of the DUT transmitter 210 can be distinguished from those of the testing receiver 220 as shown below.

Figure 4:
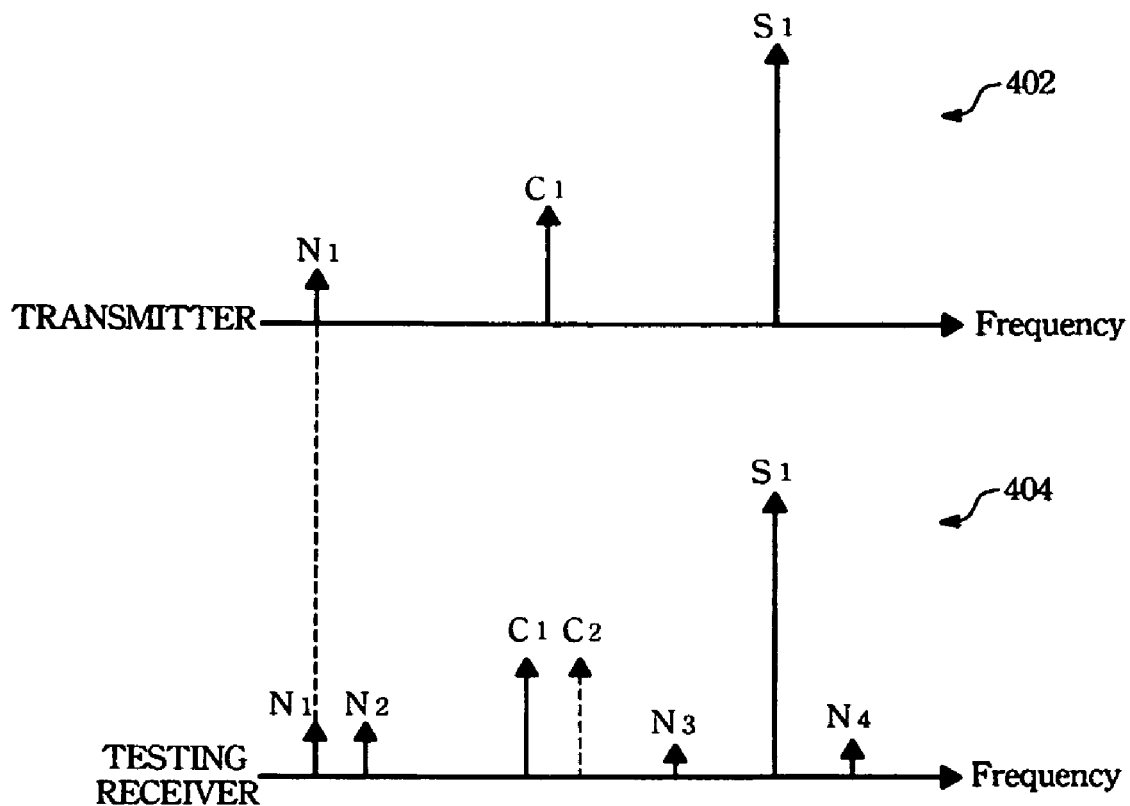
FIG. 4 illustrates frequency spectrums of output signals from a DUT transmitter and a testing receiver in accordance with one embodiment.

FIG. 4 illustrates frequency spectrums of output signals form the DUT transmitter and the testing receiver shown in FIG. 3 in accordance with one embodiment. Frequency is plotted on the X-axis and amplitude on the Y-axis. Graph 402 illustrates various frequency components of the output signal from the DUT transmitter, including the input signal to the transmitter (S1), the carrier leakage of the transmitter (C1), the sideband noise of the transmitter corresponding to its input signal (N1). Graph 404 illustrates various frequency components of the output signal from the testing receiver, including the input signal to the transmitter (S1), the carrier leakage of the transmitter (C1), the sideband noise of the transmitter corresponding to its input signal (N1), the carrier leakage of the testing receiver (C2), the sideband noise of the testing receiver corresponding to its input signal (N2), the sideband noise of testing receiver corresponding to C1 (N3), and the sideband noise of testing receiver corresponding to N1 (N4). It is noteworthy that the magnitudes of the frequency components N3 and N4 are much smaller than those of N1 and N2. This is due to the fact that N3 and N4 are sideband noise components generated at the testing receiver from two weak signal components (C1 and N1), i.e., they are the sideband noise of the transmitter's sideband noise and carrier leakage. Hence, they are negligible.

As shown in graph 404, the carrier leakage of the transmitter (C1) is offset from the carrier leakage of the testing receiver (C2) by a certain value, and the sideband noise of the transmitter (N1) is offset from the sideband noise of the receiver (N2) by a certain value. This is due to the fact that the carriers of the transmitter and receiver have different frequencies. Thus, the sideband noise and carrier leakage of the DUT transmitter can be specifically identified, and therefore minimized by software calibration. For instance, one can use the detected frequency spectrum to reduce the sideband noise. Similarly, the detected frequency spectrum can be used to suppress the carrier leakage. The above described test and adjustment procedure can be carried out during actual functioning of the transmitter, particularly when the transmitter is a base station. Such real-time calibration can be applied at some periodic time instances while the base station is functioning. The period of above calibration is quite short and it is solely for the purpose of tracking any temporal change in the characteristics of IQ imbalance and carrier leakage.

The proposed system has the following advantages. The carrier leakage and sideband noise of the DUT transmitter and testing receiver can be distinguished. This allows accurate monitoring of the imperfect characteristics of the DUT transmitter, regardless of the testing receiver. Adjusting the difference between the carrier frequencies for the transmitter and the receiver changes the observation windows for the carrier leakage and sideband noise. Since the carrier leakage and sideband noise of various sources are clearly identified, they can be suppressed by software solutions without requiring any manufacture calibration or any additional circuitry. The proposed scheme can be carried out real-time on a periodic basis in order to track any temporal characteristics of the IQ imbalance and carrier leakage. This can be done by assigning a negligible portion of time to the real time calibration.

To further improve the robustness of the detection, one could adjust the differences between the carrier frequencies for the DUT transmitter and the testing receiver in such a way that the carrier leakages and side band noises of the transmitter and the receiver would fall uniformly in separated non-overlapping regions on the frequency spectrum. The values used for software calibration will be the averaged values of signal strength over each region.

The above description is by way of example only.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A wireless communications system comprising:
at least one transmitter configured to modulate at least one input signal with a first carrier to generate a modulated output signal; and
at least one receiver configured to receive the modulated output signal and to demodulate the modulated output signal received by the receiver with a second carrier that is at a frequency different from a frequency of the first carrier, wherein the at least one receiver is configured to generate at least one demodulated output signal comprising frequency components including a first carrier leakage component of the transmitter and a second carrier leakage component of the receiver, wherein a frequency of the first carrier leakage component of the transmitter and a frequency of the second carrier leakage component of the receiver are offset by a first value, and wherein the frequency components comprise a first sideband noise component of the transmitter corresponding to the input signal and a second sideband noise component of the receiver corresponding to the modulated output signal received by the receiver such that the first and second sideband noise components are at respective frequencies which are offset from one another by a second value;
wherein at least one of the first and second carriers is adjusted such that a difference between the frequency of the first carrier and the frequency of the second carrier causes the carrier leakage components and the sideband noise components of the transmitter and receiver to fall uniformly in separate non-overlapping regions of frequency spectrum;
wherein the transmitter is configured to perform a calibration procedure to suppress the first and second sideband noise components and the first and second carrier leakage components; and
wherein the transmitter is configured to perform the calibration procedure in real-time at time instances during operation of the transmitter to adjust suppression of the first and second sideband noise components and the first and second carrier leakage components according to temporal changes in characteristics of imbalance and carrier leakage.

2. The wireless communications system of claim 1, wherein the receiver is a testing device that receives a sample of the modulated output signal.

3. The wireless communications system of claim 1, wherein the transmitter is configured to perform the calibration procedure using a process without any manufacture calibration or additional circuitry.

4. The wireless communications system of claim 3, wherein the transmitter is configured to reduce the first and second carrier leakage components and the first and second sideband noise components using an averaged value of signal strength over each non-overlapping region.

5. The wireless communications system of claim 1, wherein the transmitter is configured to modulate the input signal that has an in-phase part and a quadrature part, and the receiver is configured to demodulate the modulated output signal that is received, wherein the demodulated output signal has an in-phase part and a quadrature part.

6. A method, comprising:
modulating at least one input signal of a transmitter with a first carrier to generate a modulated output signal;
receiving the modulated output signal with a receiver;
demodulating the modulated output signal received by the receiver with a second carrier, wherein a frequency of the first carrier is different from a frequency of the second carrier, and generating at least one demodulated output signal comprising frequency components including a first carrier leakage component of the transmitter and a second carrier leakage component of the receiver, wherein a frequency of the first carrier leakage component of the transmitter and a frequency of the second carrier leakage component of the receiver are offset by a first value, and wherein the frequency components comprise a first sideband noise component of the transmitter corresponding to the input signal and a second sideband noise component of the receiver corresponding to the modulated output signal received by the receiver such that the first and second sideband noise components are at respective frequencies which are offset from one another by a second value;
identifying the frequency components generated by the transmitter apart from those generated by the receiver;
adjusting at least one of the frequencies of the first and second carriers respectively such that a difference between the frequency of the first carrier and the frequency of the second carrier causes the carrier leakage components and the sideband noise components of the transmitter and receiver to fall uniformly in separate non-overlapping regions of frequency spectrum;
executing a calibration procedure to suppress the first and second sideband noise components and the first and second carrier leakage components; and
wherein executing comprises executing the calibration procedure in real-time at time instances during operation of the transmitter to adjust suppression of the first and second sideband noise components and the first and second carrier leakage components according to temporal changes in characteristics of imbalance and carrier leakage.

7. The method of claim 6, wherein executing comprises executing the calibration procedure using a process without any manufacture calibration or additional circuitry.

8. The method of claim 6, wherein executing comprises executing the calibration procedure using an averaged value of signal strength over each non-overlapping region.

9. A system, comprising:
at least one receiver configured to receive a modulated output signal transmitted by a transmitter that modulated an input signal with a first carrier, wherein the receiver is configured to demodulate the modulated output signal that is received by the receiver with a second carrier at a frequency different from a frequency of the first carrier to generate at least one demodulated output signal that has frequency components including a first carrier leakage component of the transmitter and a second carrier leakage component of the receiver, wherein a frequency of the first carrier leakage component of the transmitter and a frequency of the second carrier leakage component of the receiver are offset by a first value, and wherein the frequency components comprise a first sideband noise component of the transmitter corresponding to the input signal and a second sideband noise component of the receiver corresponding to the modulated output signal received by the receiver such that the first and second sideband noise components are at respective frequencies which are offset from one another by a second value;
wherein the at least one receiver is configured to adjust a difference between the frequency of the first carrier and the frequency of the second carrier to cause the carrier leakage components and the sideband noise components of the transmitter and receiver to fall uniformly in separate non-overlapping regions on a frequency spectrum;

wherein the transmitter is configured to perform a calibration procedure to suppress the first and second sideband noise components and the first and second carrier leakage components; and wherein the transmitter is configured to perform the calibration procedure in real-time at time instances during operation of the transmitter to adjust suppression of the first and second sideband noise components and the first and second carrier leakage components according to temporal changes in characteristics of imbalance and carrier leakage.

10. The system of claim 9, wherein the transmitter is configured to perform the calibration procedure using a process without any manufacture calibration or additional circuitry.

11. The system of claim 9, wherein the transmitter is configured to reduce the first and second carrier leakage components and the first and second sideband noise components using an averaged value of signal strength over each non-overlapping region.

* * * * *